United States Patent [19]
Lewis

[11] Patent Number: 5,139,301
[45] Date of Patent: Aug. 18, 1992

[54] PORTABLE TRUCK BED SEAT

[76] Inventor: William J. Lewis, 385 Greenlake Dr., Sunnyvale, Calif. 94089

[21] Appl. No.: 704,881

[22] Filed: May 23, 1991

[51] Int. Cl.⁵ .................................... B60N 2/24
[52] U.S. Cl. .................................... 296/63; 297/254
[58] Field of Search ............... 296/63, 64, 65.1; 297/254

[56] References Cited

U.S. PATENT DOCUMENTS

| | | | |
|---|---|---|---|
| 3,829,151 | 8/1974 | Fellenstein | 296/64 |
| 3,840,263 | 10/1974 | Bowden | 296/64 |
| 4,527,828 | 7/1985 | Groce et al. | 296/65.1 |
| 4,679,840 | 7/1987 | Fry et al. | 296/64 |
| 5,029,928 | 7/1991 | Huber | 296/63 |

Primary Examiner—Robert R. Song
Attorney, Agent, or Firm—Leon Gilden

[57] ABSTRACT

Several embodiments of a portable truck bed seat are designed for use in the bed of a pickup truck. Each seat includes short legs and body-supporting cushions attached to an associated frame structure. Adjustable clamps are movably attached to the frame structures, and these clamps are attachable to the edges or lips of the truck beds to effectively lock the seats in position during use.

7 Claims, 5 Drawing Sheets

PORTABLE TRUCK BED SEAT

BACKGROUND OF THE INVENTION

1. Field of the Invention

The present invention relates to portable chairs, and more particularly pertains to portable seats which may be removeably secured within the beds of pickup trucks or the like.

2. Description of the Prior Art

The use of portable seats in truck beds is known in the prior art. For example, U.S. Pat. No. 3,840,263, which issued to R. Bowden on Oct. 8, 1974, discloses a portable seat for trucks which is removeably positioned against the front wall of a pickup truck body and is held in place by adjustable braces which abut the wheel wells above the body floor. In effect, this portable seat assembly is held in a locked position by extendable locking arms which force the seat into a fixed position between the truck bed wall and the associated wheel.

Another typical seat for a truck bed is shown in U.S. Pat. No. 4,679,840, which issued to Fry et al on Jul. 14, 1987, with this flexible cloth seat having front and back lateral runners for positioning between the opposed sidewalls of a truck bed. The runners are telescopic in construction and special connectors are used to fixedly secure the runners to the truck bed sides once the runners have been extended to a desired length.

As can be appreciated, both of the above-described truck bed seats are functional for their intended purposes; however, neither have apparently been commercially successful. This lack of commercial success might be due to the complexity of construction associated with each type of seat and accordingly, it can be appreciated that there is a continuing need for new and improved truck bed seats which can be easily and efficiently manufactured and used. In this, the present invention substantially fulfills this need.

SUMMARY OF THE INVENTION

In view of the foregoing disadvantages inherent in the known types of truck bed seats now present in the prior art, the present invention provides an improved truck bed seat construction wherein the same can be easily attached to and removed from a truck bed while providing a secure seating arrangement for a user when needed. As such, the general purpose of the present invention, which will be described subsequently in greater detail, is to provide a new and improved truck bed seat which has all the advantages of the prior art truck bed seats and none of the disadvantages.

To attain this, the present invention comprises several embodiments of a portable truck bed seat which are designed for use in the bed of a pickup truck. Each seat includes short legs and body-supporting cushions attached to an associated frame structure. Adjustable clamps are movably attached to the frame structures, and these clamps are attachable to the edges or lips of the truck beds to effectively lock the seats in position during use.

There has thus been outlined, rather broadly, the more important features of the invention in order that the detailed description thereof that follows may be better understood, and in order that the present contribution to the art may be better appreciated. There are, of course, additional features of the invention that will b described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore a object of the present invention to provide a new and improved portable truck bed seat which has all the advantages of the prior art portable truck bed seats and none of the disadvantages.

It is another object of the present invention to provide a new and improved portable truck bed seat which may be easily and efficiently manufactured and marketed.

It is a further object of the present invention to provide a new and improved portable truck bed seat which is of a durable and reliable construction An even further object of the present invention is to provide a new and improved portable truck bed seat which is susceptible of a low cost of manufacture with regard to both materials and labor, and which accordingly is then susceptible of low prices of sale to the consuming public, thereby making such portable truck bed seats economically available to the buying public.

Still yet another object of the present invention is to provide a new and improved portable truck bed seat which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
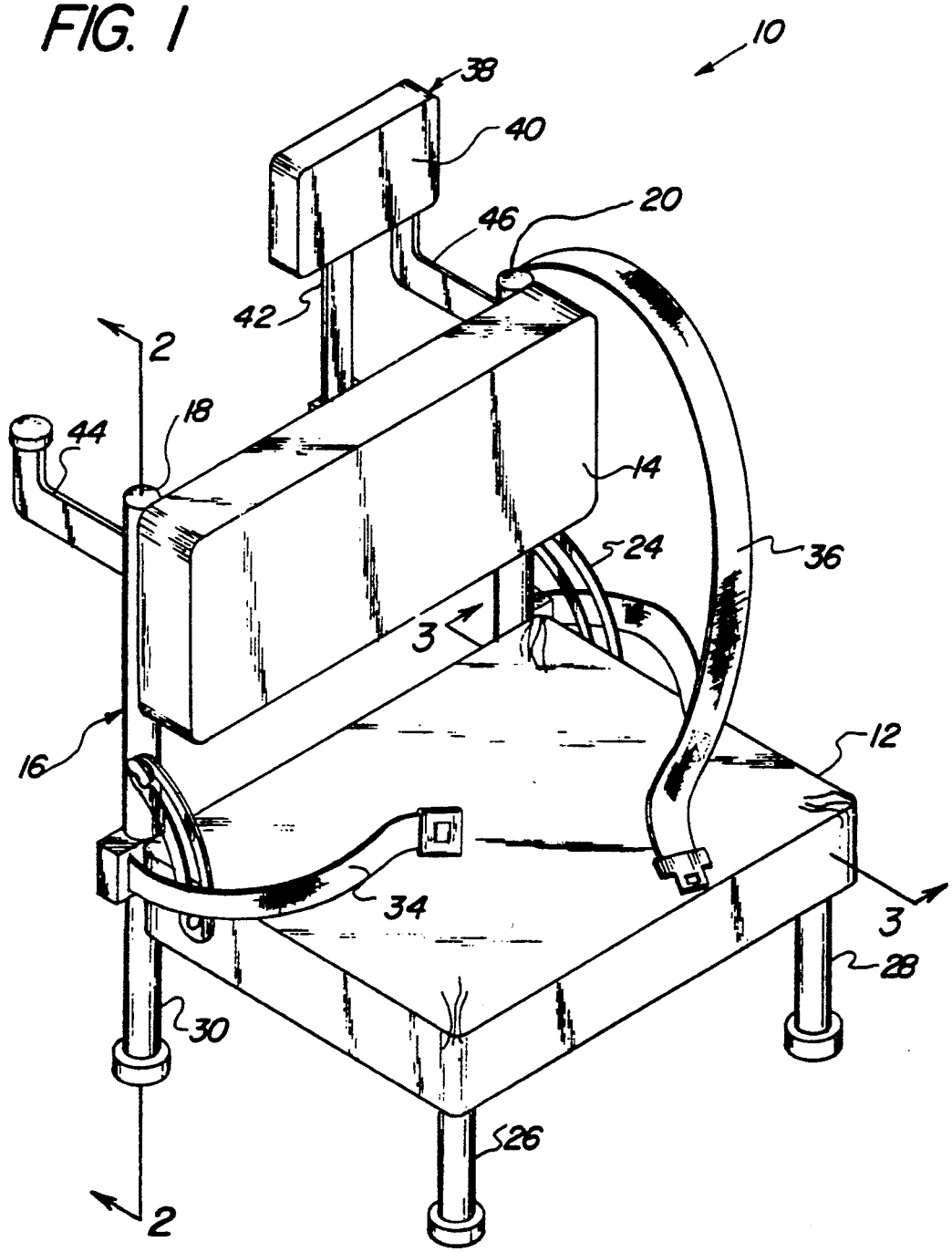
FIG. 1 is a perspective view of a first embodiment of the truck bed seat comprising the present invention.

With reference now to the drawings, and in particular to FIG. 1 thereof, a first embodiment of a new and improved portable truck bed seat embodying the principles and concepts of the present invention and generally designated by the reference numeral 10 will be described.

More specifically, it will be noted that the truck bed seat 10 includes a seat cushion 12 and a backrest cushion 14 effectively attached together by means of a rear frame structure 16. The rear frame structure 16 is defined by a pair of upstanding tubular supports 18, 20 having respective curvilinearly-shaped slotted brackets 22, 24 attached thereto. Brackets 22, 24 are interconnected in a known manner between the frame structure 16 and the seat cushion 12 to facilitate a foldable relative movement between the seat cushion and the backrest cushion 14. Appropriate wing nuts can be used in a known manner to effectively secure the seat cushion 12 in any desired relative position as defined by the limits of motion permitted by the brackets 22, 24.

Figure 3:
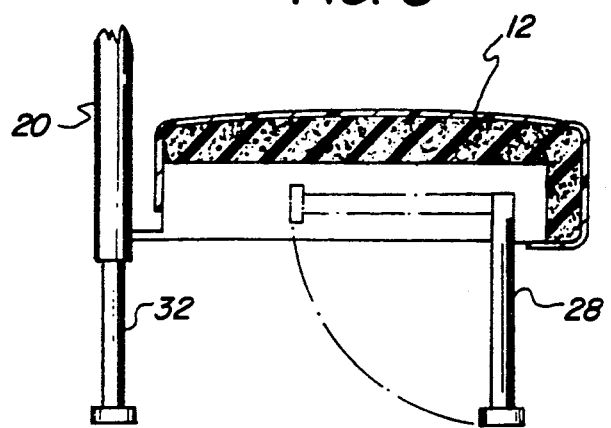
FIG. 3 is a cross-sectional view of the invention as viewed along the line 3—3 in FIG. 1.

As shown in FIGS. 1 and 3, a pair of foldup or retractable legs 26, 28 can be conventionally attached to the front of the seat cushion 12 while a pair of rearwardly located spring-loaded legs 30, 32 may be telescopingly positioned within the support arms 18, 20. The use of the rearwardly positioned legs 30, 32 will be subsequently described in greater detail.

The truck bed seat 10 further includes a waist seat belt 34 and a pullover shoulder seat belt 36 with both of these belts being adjustable in length to accommodate the needs of a user. An adjustably positionable headrest 38 includes a headrest cushion 40 attached to a telescopingly bar member 42 attached to a rear portion of the backrest cushion 14.

Figure 2:
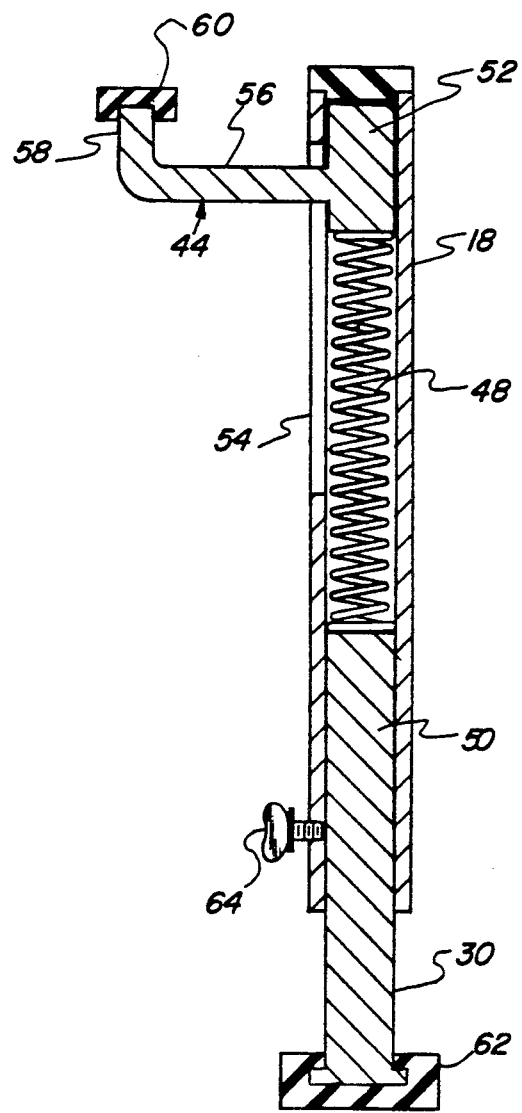
FIG. 2 is a cross-sectional view of the invention as viewed along the line 2—2 in FIG. 1.

With reference to FIGS. 1 and 2 of the drawings, it will be noted that a pair of L-shaped adjustable clamps 44, 46 are slidably retained within the respective tubular arms 18, 20. A typical arrangement of the adjustable clamp 44 is illustrated in FIG. 2 wherein it can be seen that the frame member 18 is of a hollow construction and includes a captured internal compression spring 48 which is positioned between a top end 50 of the rear leg 30 and an integral solid tubular portion 52 forming a part of the L-shaped member 44. A rectangularly-shaped longitudinal slot 54 extends along a portion of the axial length of the tubular frame member 18 with the L-shaped arm member 56 extending outwardly through the slot being slidably moveable therein in a now apparent manner. A top end 58 of the L-shaped arm 56 is protectively covered by a rubber pad 60, while a further rubber pad member 62 is secured to a bottom of the leg 30. An adjustable locking means in the form of a thumbscrew 64 is also illustrated in FIG. 2 with the construction of this entire assembly being substantially identical to the construction of the L-shaped adjustable clamp 46 retained within the tubular frame member 20.

Figure 6:
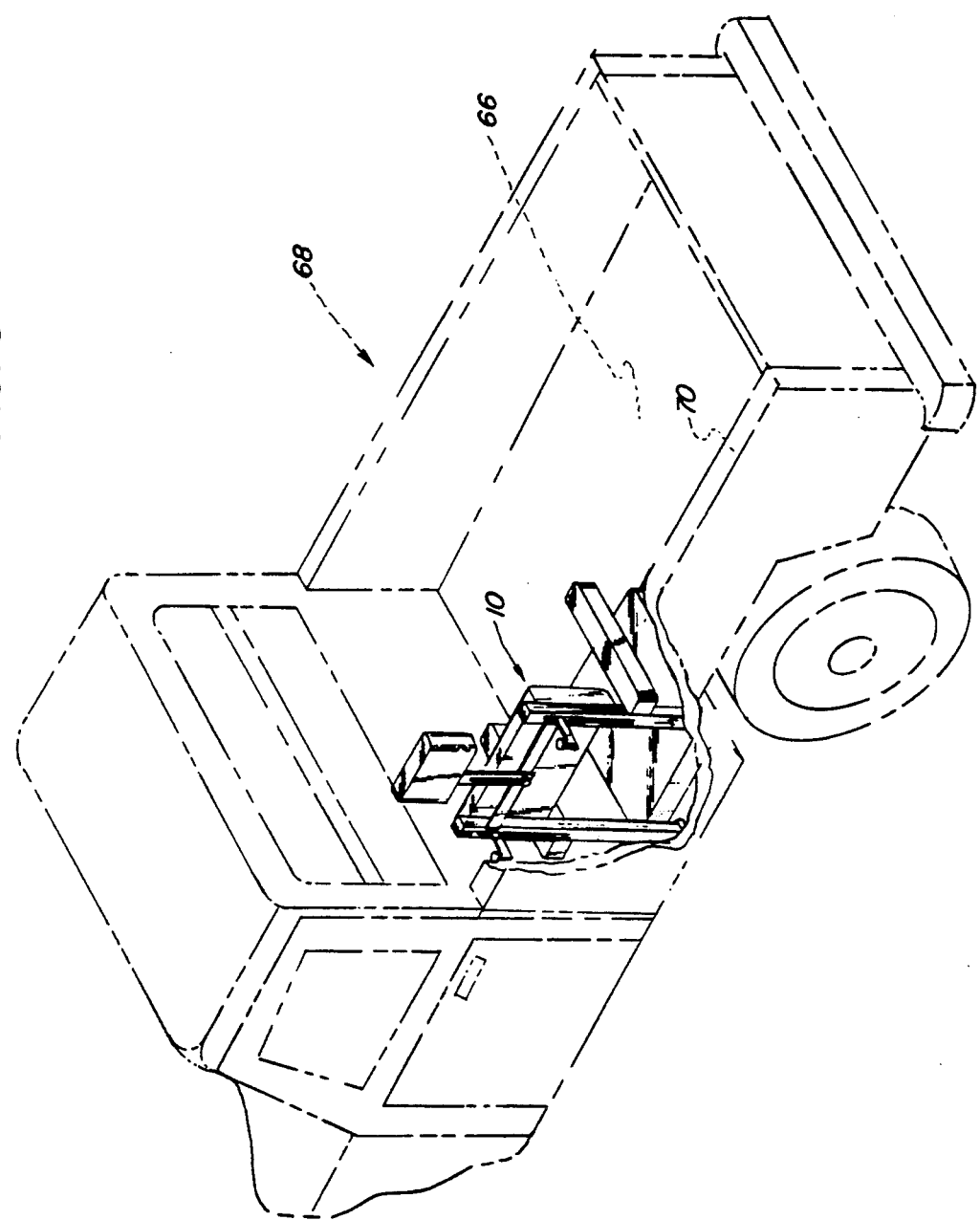
FIG. 6 is a perspective view of the first embodiment of the invention showing the same operably attached to a pickup truck bed.

FIG. 6 of the drawings illustrates the manner of usage of this first embodiment 10 of the invention wherein the same is shown as being operably positioned within the bed 66 of a pickup truck 68. As is now apparent, a portable seating unit 10 can be removeably positioned against a sidewall 70 of the truck bed 66, and an initial adjustable height can be achieved through a loosening of the thumbscrews 64 to facilitate a desired lengthening or shortening of the telescoping legs 30, 32 within their respective tubular members 18, 20. Once the desired height has been achieved, the pair of thumbscrews 64 can be tightened to secure the legs 30, 32 within their respective supports 18, 20, and the adjustable clamps 44, 46 can then be manually pushed downwardly within the slots 54 whereby the seat assembly 10 can be pushed completely back against the sidewall 70. Once the adjustable clamps 44, 46 are released, the rubber pads 60 associated with the ends 58 of the clamps will move under the lip of the truck bed sidewall and serve to securely hold the seat 10 with a locked position due to the force of the compression springs 48 holding both of the clamps in an upwardly extended location.

Figure 4:
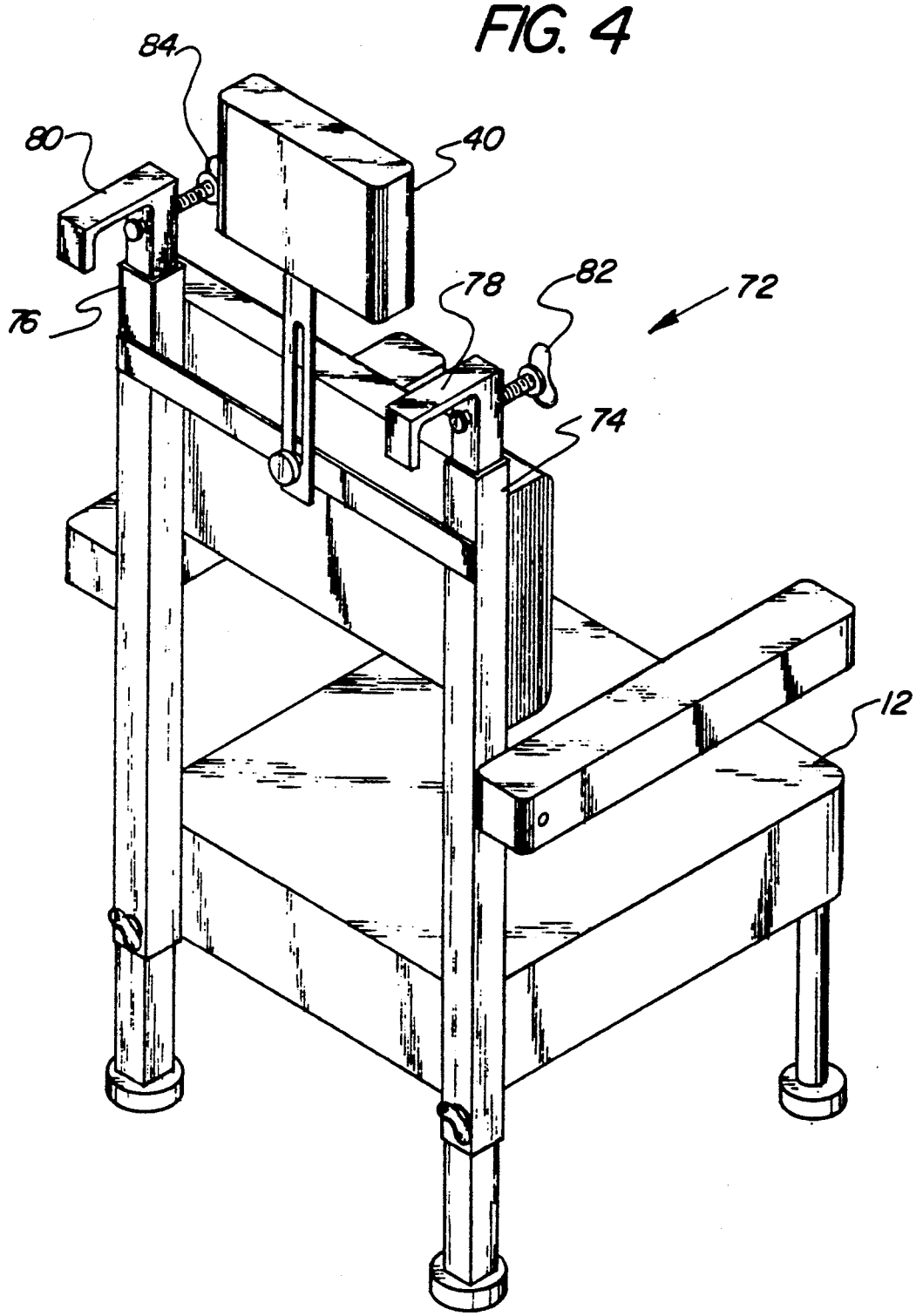
FIG. 4 is a rear perspective view of a second embodiment of the invention.

FIG. 4 of the drawings illustrates a modified embodiment of the invention which is generally designated by the reference numeral 72. This modified embodiment 72 is substantially similar to the embodiment 10 shown in FIG. 1 with the exception that the tubular supports 18, 20 have been replaced by a pair of rectangularly-shaped supports 74, 76. Additionally, modified adjustable clamps 78, 80 are slidably retained within the respective support arms 74, 76. Each of the clamps 78, 80 are of a U-shaped construction and are designed to overlap the top edge of a truck sidewall 70 as illustrated in FIG. 6. Once the clamps 78, 80 are positioned over the edge of a truck sidewall 70, respective thumbscrews 82, 84 may be engaged with the sidewall to effectively hold the seating unit 72 in position at a desired location in abutment with the supporting side of the truck 68.

Figure 5:
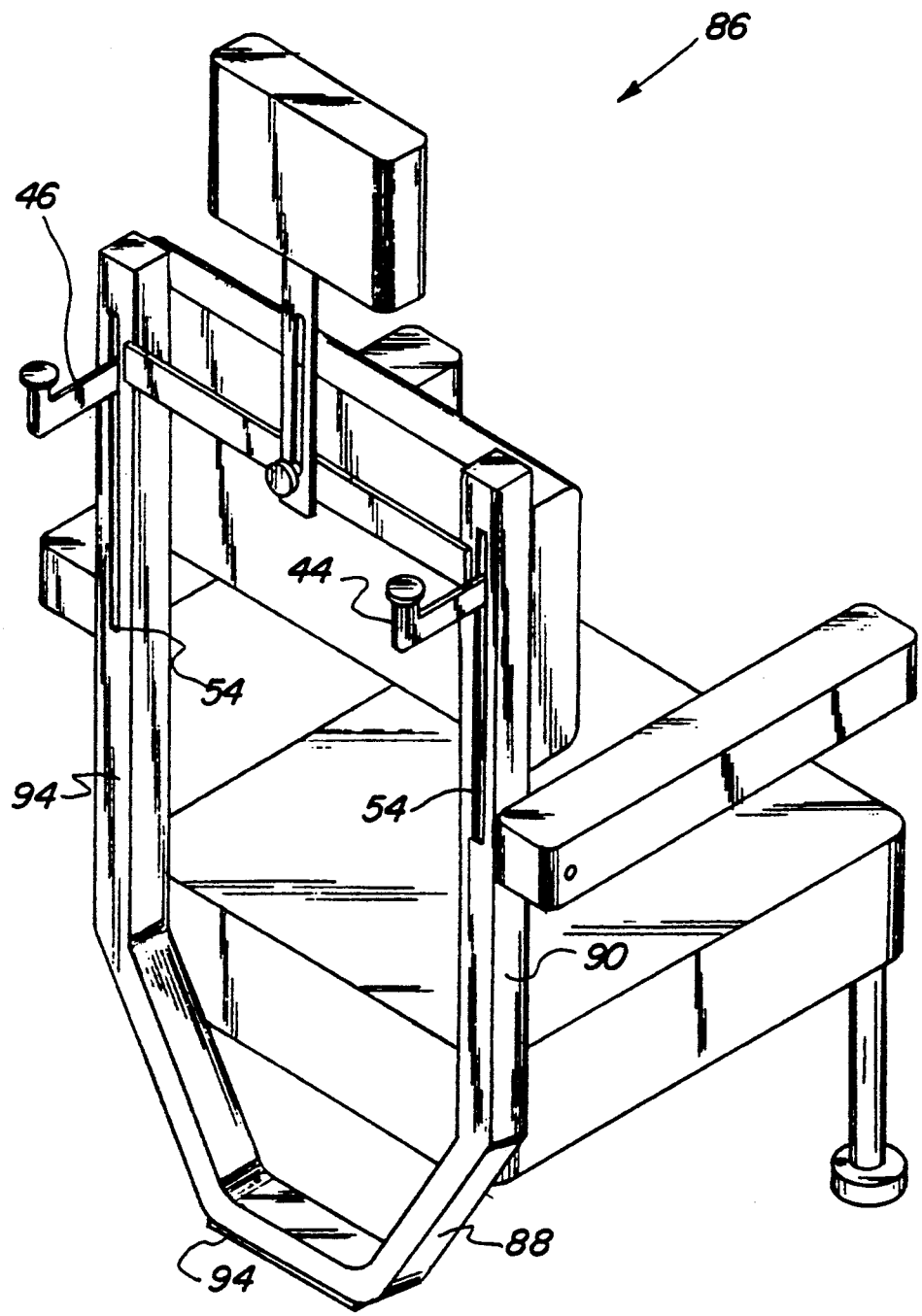
FIG. 5 is a rear perspective view of a third embodiment of the invention.

FIG. 5 of the drawings illustrates even a further embodiment of the seating unit comprising the present invention wherein such further embodiment is generally designated by the reference numeral 86. This latter embodiment 86 of the invention utilizes the same adjustable clamps 44, 46 slidably moveable within guide slots 54 and being spring-biasedly moveable upwardly to engage the lip of an unillustrated truck sidewall. The basic difference of this embodiment is in the structure of the bottom support legs wherein a continuous U-shaped member 88 extends between the support arms 90, 92 with this U-shaped member being integral therewith. If desired, a magnet 94 can be fixedly secured to a bottom portion of the U-shaped leg support 88 to provide even a more effective manner of holding the seating unit 86 in position within a truck bed 66.

As to the manner of usage and operation of the second and third embodiments of the present invention, the same should be apparent from the above-description relating to the manner of operation and use of the first embodiment. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved truck bed seat assembly comprising:

seat cushion means;

backrest cushion means attached to said seat cushion means;

rear frame support means, said seat cushion means and said backrest cushion means being attached thereto; and adjustable clamp means being vertically movably attached to said rear frame support means, said adjustable clamp means being engageable with a top portion of a sidewall of said truck.

2. The new and improved truck bed seat assembly as described in claim 1, wherein said adjustable clamp means is spring-biasedly retained within said rear frame support means.

3. The new and improved truck bed seat assembly as described in claim 2, wherein said adjustable clamp means includes at least one L-shaped member having an upstanding arm engagable beneath a lip portion of said truck sidewall.

4. The new and improved truck bed seat assembly as described in claim 3, wherein said at least one L-shaped member is slidably moveable within an axially aligned slot formed in said rear frame support means, said L-shaped member being moveable downwardly against a compression force produced by a compression spring retained within said rear frame support means, said compression spring forcing said upstanding arm into engagement with said lip of said truck sidewall.

5. The new and improved truck bed seat assembly as described in claim 4, wherein a bottom portion of said compression spring provides a spring biased movement of first and second rear legs telescopingly received within said rear frame support means.

6. The new and improved truck bed seat assembly as described in claim 2, wherein said adjustable clamp means comprises at least one U-shaped member slidably retained within said rear frame support means, said U-shaped member having a downwardly extending arm portion selectively positionable over an edge of a truck sidewall and further including locking means for securing said U-shaped member in engagement with said truck sidewall after such a positioning has been achieved.

7. The new and improved truck bed seat assembly as described in claim 6, wherein said locking means comprises a thumbscrew moveable within a through-extending threaded aperture formed in said U-shaped member.

* * * * *